United States Patent [19]

Conley

[11] 4,138,993
[45] Feb. 13, 1979

[54] SOLAR HEATER

[76] Inventor: William M. Conley, 376 Franklin Ave., Redlands, Calif. 92373

[21] Appl. No.: 758,032

[22] Filed: Jan. 10, 1977

[51] Int. Cl.² .............................................. F24J 3/02
[52] U.S. Cl. .................................... 126/271; 237/1 A
[58] Field of Search ............... 126/270, 271; 237/1 A; 165/162, 172

[56] References Cited

U.S. PATENT DOCUMENTS

| 820,127 | 5/1906 | Pope | 237/271 |
|---|---|---|---|
| 2,396,338 | 3/1946 | Newton | 126/271 |
| 2,467,885 | 4/1949 | Freund | 126/271 |
| 3,254,644 | 6/1966 | Thannhauser | 126/271 |
| 3,910,490 | 10/1975 | Saypalia, Jr. | 237/1 A |
| 3,939,819 | 2/1976 | Minardi | 126/271 |
| 3,968,786 | 7/1976 | Spielberg | 126/271 |
| 3,977,601 | 8/1976 | Bearzi | 237/1 A |
| 4,014,314 | 3/1977 | Newton | 126/271 |

Primary Examiner—Henry C. Yuen

[57] ABSTRACT

A low-cost modular designed solar heater for heating a fluid under pressure for a multiplicity of uses. This unit is designed to be built from commercially available standard components. It may be utilized for heating swimming pools, houses, or domestic water sources. It is constructed of pressure-retaining tubing circularly disposed in a container which displays the tubing to the sun rays and coincidentally retains the tubing in the desired shape. The tubing comprises a coil of black material with high heat absorbtivity and a specially treated surface to reduce reflectivity. The inside surface of the retaining container is lined or coated with a highly reflectivity smooth material which reflects the sun's rays onto the heat absorbing tubing. The modular units may have a special clear covering which creates a heat sink inside the units reducing heat losses due to convection. These modular units are designed to be connected hydraulically in parallel or series and may be utilized as a closed or continuous flow system, depending on the use it is put to.

5 Claims, 5 Drawing Figures

SOLAR HEATER

BACKGROUND OF THE INVENTION

The present invention relates to the application of solar heat for heating swimming pools, houses, domestic water supplies, etc. There have been many systems proposed for utilizing solar heat for heating swimming pools. Most of them are not commercially feasible because of their high cost or lack of efficiency. Many are limited in application because of a lack of ability to retain pressure. Others do not have the capability of being operated as a closed system as well as an open system. Some do not have the structural rigidity to support themselves while others are so rigid that they cannot be favorably disposed to capture the sun's radiation in the most efficient manner. What is needed is a highly efficient, inexpensive, versatile system which can compete with other forms of energy in an economic and reliable way. This invention addresses itself to all of these problems.

SUMMARY OF THE INVENTION

The present invention seeks to overcome all of the aforementioned deficiencies by utilizing readily available commercial materials which by their very nature minimize costs of fabrication. This unit is designed so that modular units are of such size that they are easily transported by commercial means and may be installed by unskilled craftsmen. The units are designed to be very flexible in their hookup. Depending on the use contemplated, they may be coupled in series or parallel.

The most common use is intended for heating swimming pools by circulating cold pool water directly through the heating units which are favorably disposed to capture the sun's radiant heat. Normally the units may be coupled to the standard pool filtering and circulating system. If this method is used, the system may or may not be connected in series with gas fired heaters. If they are used in conjunction with a gas fired heater, they are normally placed upstream of same. The modular heating units are structurally sound and are self-supporting. They may incorporate an adjustable evection system which displays the units at the correct angle for the latitude and the sun's elevation. An auxiliary, optional feature is a rotating support unit which orients the units favorably toward the sun's rays throughout the day by a simple clock-operated central unit and mechanical linkage.

When these units are used on a domestic water supply, they may be operated to pre-heat the domestic water directly in temperate climates or they may be connected as a closed system utilizing a recirculating fluid and an appropriate heat exchanger as later described. When used in a closed system, a separate circulating pump and special heat conducting fluid may be used. The heating fluid may or may not be water with or without additives for increased cooling or lowering of the freezing point. The heating system's flexibility is illustrated in that it may be coupled so that it is operated completely manually or with various degrees of automatic control.

The solar heating modules are usually of standard commercially manufactured materials which may be as follows, but are not limited to the described items. The retaining receptacle may be manufactured with a bottom of standard sized plywood and sides of suitable lumber. It may be glued or nailed together to form a retaining box. A heat-conducting tubing which is flexible and usually extruded from a durable black plastic which may be polyurethane, polyethylene, or other suitable material. The tubing is treated so as to have a black, non-shiny surface. This is done in order to maximize the emissivity and hence the absorptivity of the material. It has frequently been shown that in extremely windy areas a considerable heat loss is experienced when wind is allowed to impinge upon the heat-absorbing tubing. This system prevents this by stretching a heavy, clear material (with a very low reflective coefficient) stretched tightly over the modules and sealed over the edges, forming a relatively airtight compartment which actually acts as a heat sink and prevents conductive heat losses. The inside of the retaining receptacle is lined or coated with a highly reflective, smooth surface such as aluminum foil or aluminum paint, which reflects the rays to the underside of the heat-conducting tubing.

DESCRIPTION OF THE PREFERRED EMBODIMENTS

Figure 2:
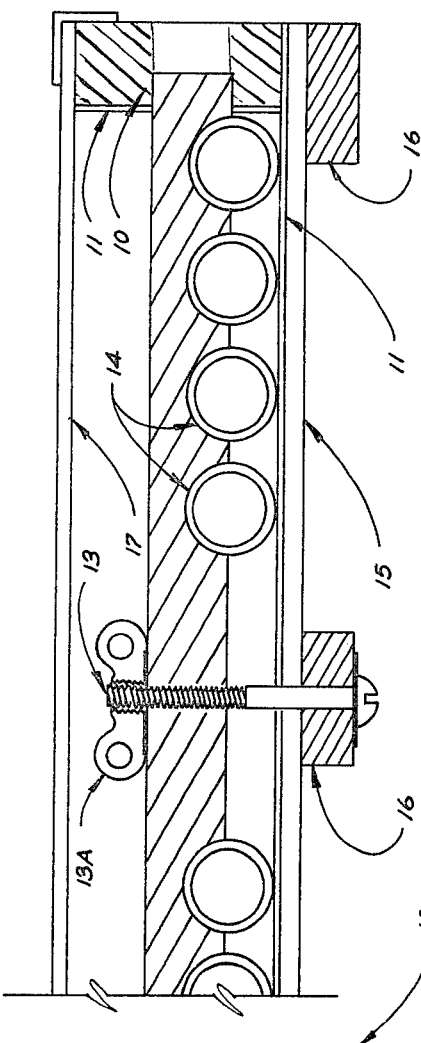
FIG. 2 is a sectional view of the heat exchanger as indicated by line 2—2 of FIG. 1. It shows details of construction and assembly.
Figure 1:
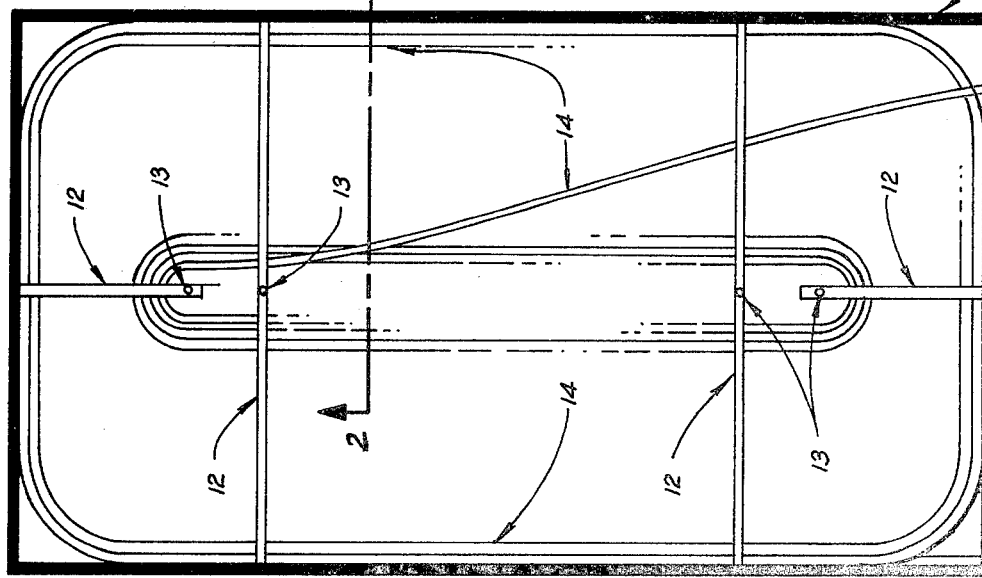
FIG. 1 is a plan view of a modular heat exchanger forming a preferred embodiment with sectional view indicated.

FIGS. 1 and 2 show detailed construction of the modular heating units, which consists of a base 15 of inexpensive material such as plywood. There are four sides 10 mounted on the base 15 which form a retaining box, in which is coiled the heat-absorbing tubing 14 in a spacing and manner which gives the most efficient heat transfer. The tubing 14 can be almost any flexible material which has a high absorptivity but usually will be constructed of an inexpensive material such as a flexible plastic which can be easily shaped. It may be specially treated in order to reduce reflectivity and increase absorptivity. The tubing 14 is retained in proper position in the box by retaining members 12 which may be contoured to retain the tubing 14 both laterally and vertically. This retaining member may be fastened through the base 15 by means of a retaining bolt 13 and wing nut 13a. The retaining member 12 may be secured to the sides 10 by inserting the end into a properly positioned hole in the side 10. The top of the modular heater may be covered by a special sheet of transparent material 17 which allows the sun's rays to penetrate it. It should be constructed of a material that reduces reflective losses to a minimum. The cover 17 is fastened securely to the sides 10. Its purpose is to create a dead-air space under it, reducing convective losses and creating a heat sink which increases the unit's thermal efficiency.

The interior of the unit is covered or coated completely with a very smooth reflective lining 11 which may be bright aluminum foil or aluminum paint. The sole requirement is that it be highly reflective in order to reflect the sun's rays back to the underside of the tubing 14, thus reducing losses. The tubing 14 is in mating contact with the liner 11 and does absorb heat by conduction as well as radiation. The modular units normally will have supporting runners 16 mounted underneath for reinforcing and supporting the module.

Figure 3:
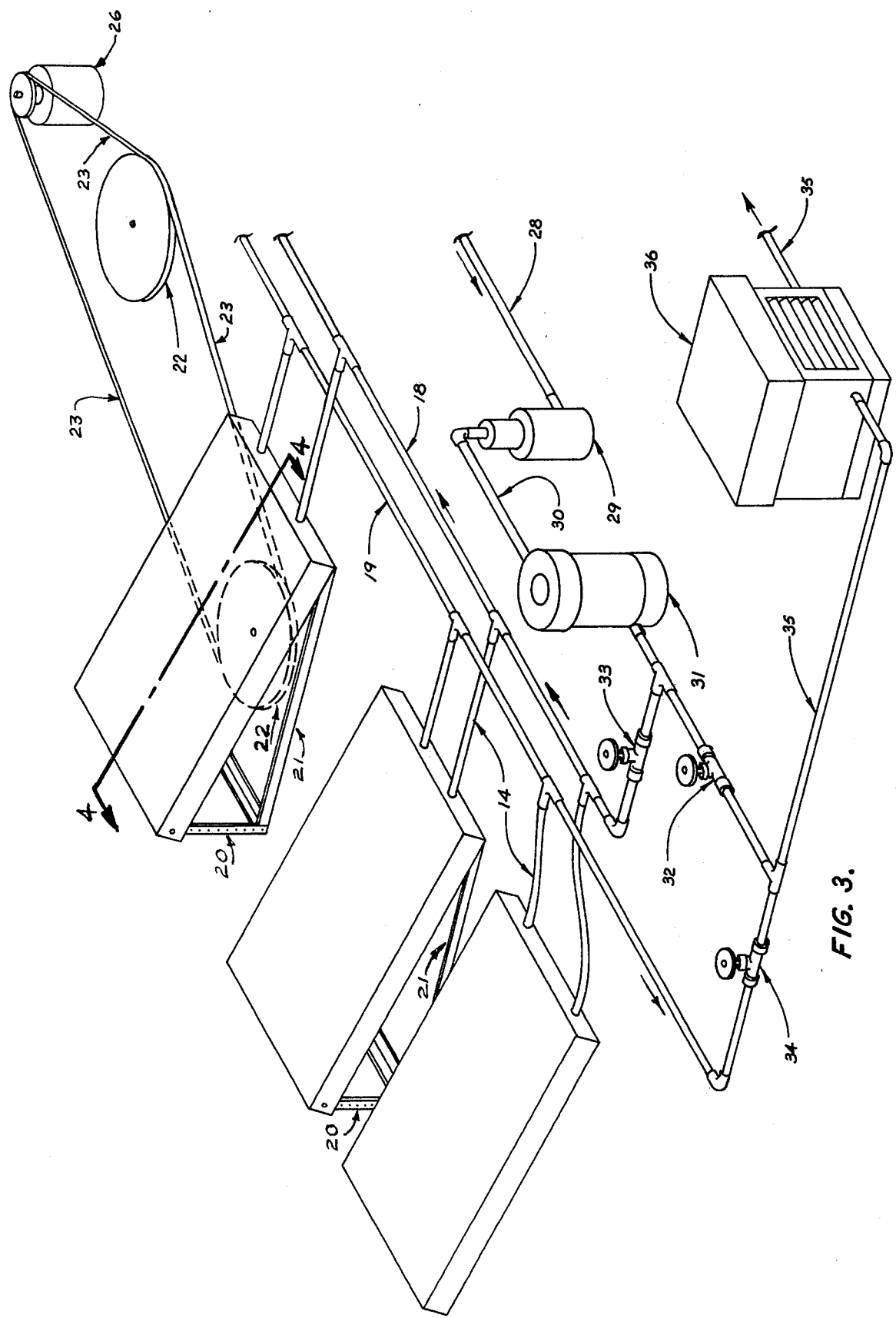
FIG. 3 is a perspective view of typical assembled modular units schematically showing piping and plumbing. It also shows three possible erection methods: one roof-supported, a second on its own adjustable stand, and a third on the optional automatic rotating base. This shows how the units are coupled together in a typical fashion with the clock-controlled power unit which is capable of operating several units simultaneously. The rotating bases automatically orient the modules to favorably face the sun throughout the heating period. The schematic piping arrangement is a typical method of piping the units to a swimming pool.

FIG. 3 shows a composite of various erection methods such as roof mounted, free standing, or rotatably mounted. It also shows a typical method of hooking the units and schematically shows the fluid flow through a typical swimming pool installation. Pool water is piped 28 to a conventional pump 29 which raises the pressure and causes it to flow through a pipe 30 into a filter 31 and hence through a shutoff valve 33. This valve may be a manual or an automatically actuated and in some cases could be a flow control valve. From valve 33, the flow is directed to the heater supply manifold 18. Water is taken from the manifold 18 via tubing 14 through the heating units and then returned to the return manifold 19. The return manifold directs the flow through a shutoff valve 34 to the return line to the pool 35. If a gas fired auxiliary heater 36 is used, it would normally be placed in line 35 as shown. A bypass valve 32 is provided to bypass all or part of the flow around the solar heater.

A simple adjustable stand is composed of legs 20 which can be adjusted to give the solar heater the optimum angle for capture of the sun's rays. Side braces 21 are provided to stabilize the units.

The optional rotary base is shown to consist of anchoring members 25 through which a center anchor bolt 24 serves as a fulcrum for the large rotating unit 22 on which the modular heaters are mounted rigidly. The rotating unit 22 has a drive belt 23 wrapped completely around it and hence continuing to the next rotary unit to couple all of the rotating units together with this overdrive belt 23. The belt 23 can consist of a flexible nylon braided rope made continuous and driven by a very high gear reduction motor 26 coupled to the drive sheave 27. This drive unit is suitably geared so that the drive belt 23 caused the rotary bases 22 to exactly follow the sun's path across the sky. In this manner, the solar units will always be correctly facing the radiant source at all times through the heating cycle.

The units are electrically reversed by use of limit switches in the afternoon when the heating cycle ends. They then return to their original morning starting orientation. The next cycle is started by a time clock which is properly synchronized to the sun's solar path. The drive belt 23 is kept taut by spring tension on the entire system. Releasing said spring tension will allow each solar heating module to be properly aligned with the rising sun.

Figure 4:
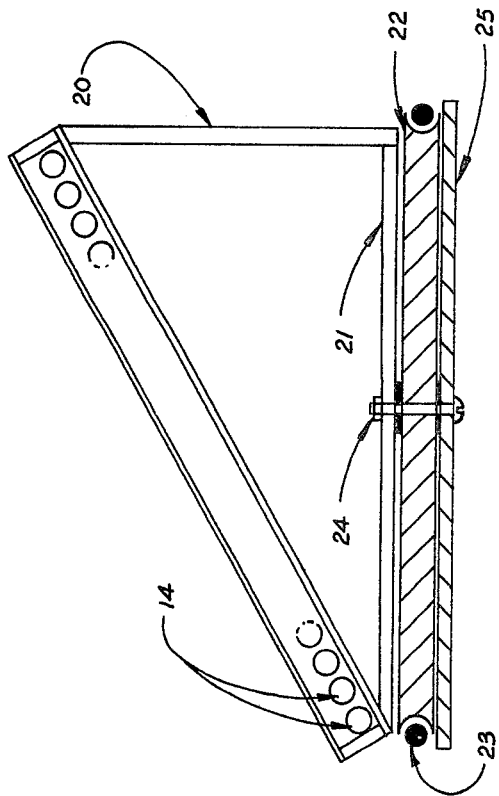
FIG. 4 is a sectional view of the modular heating unit mounted on the rotating base mentioned in FIG. 3. The section is viewed along the line 4—4 of FIG. 3.

FIG. 4 schematically shows a sectional view of the rotating base units 22. Due to the very slow rotation required, the drive motor 26 may be of very small size. It is realized that the cost of a rotating system must be balanced against the increased thermal efficiency obtained.

Figure 5:
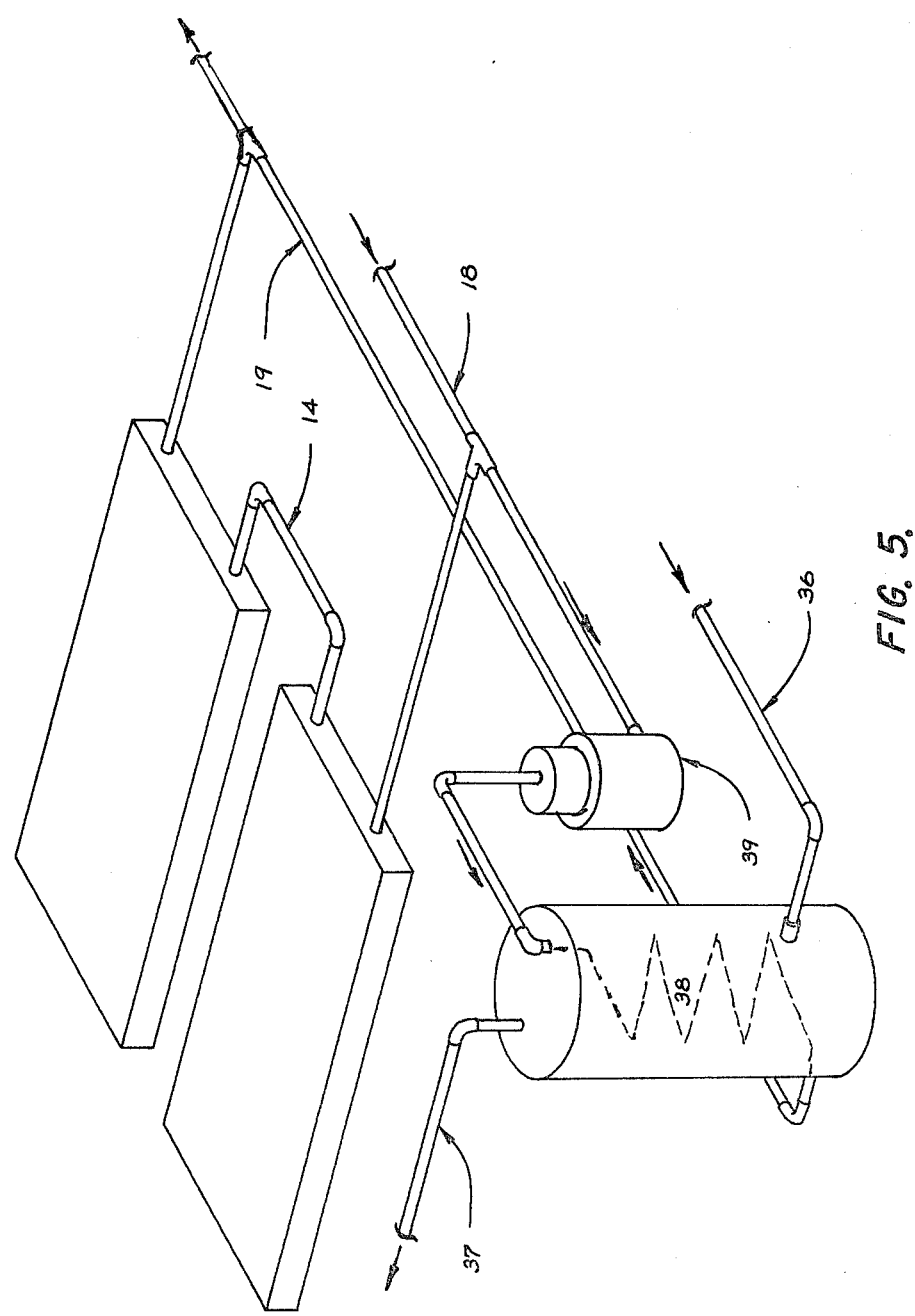
FIG. 5 shows a typical hookup to a domestic water system with the piping arranged as a closed circulating system.

FIG. 5 illustrates a typical hookup as a closed system for heating domestic domiciles or water supplies. This figure is intended only to show schematically the installation. The modular heating units are hooked up as before except they would normally be hooked in series instead of parallel. This allows a greater temperature increase on each pass through the unit. A pump 39 is placed in the supply header 18 which pumps the heating fluid through any number of units and hence to the return header 19 where it is directed to a heat exchanger and storage tank 38. This storage tank can take many shapes but one economical shape is similar to a domestic water heater with an insulating jacket around it to retain the heat. The domestic water supply in this case is directed through a line 26 to the holding tank and hence to the domicile through line 37. The system can be used for heating a house by increasing the size of the holding tank 38. It can be used for cooling by running the pump 39 at night instead of the daytime. This system is suited for addition of an additive which can decrease the freezing point of the heat-carrying fluid, thus allowing its use in severe winter climates.

The present invention has been described with reference to certain preferred embodiments. The spirit and scope of the appended claims should not however necessarily be limited to the foregoing description.

What is claimed is:

1. A low-cost solar heating and cooling system having a fluid supply manifold and return manifold comprising a plurality of solar collector modular units, each modular unit having a base attached to vertical sides to form an open containing box in which a flexible heat absorbinb tubing is disposed in a concentric semi-circular convoluted manner therein to receive incident radiation from the sun, the heat absorbing tubing being optimally spaced from each convolution on top of the base within the unit so that the amount of heat reflected to the back side of the heat absorbinb tubing is maximized, the heat absorbing tubing having a very high emissivity and hence absorptivity which maximizes the heat transferred into a heating exchange fluid circulating in the heat absorbing tubing, the modular units being connected hydraulically in series or parallel, a retaining member within each modular unit for vertically and laterally retaining the heat absorbing tubing on top of the base so that heat is absorbed by radiation and conduction, a lining having a highly reflective and heat conductive coating being positioned between the base and the heat absorbing tubing so that the contact points between the heat absorbing tubing and the coating will increase heat transfer by conduction, each modular unit being mounted on a pulley-like rotatable base, each rotatable base having an endless pulley belt rotatably connecting to an output shaft of a high gear ratio electric motor whereby each rotatable base can be driven by the motor, with the rotatable modular units being kept in synchronization by friction applied by belt tension in the continuous belt, the motor being controlled by a timer in conjunction with limit switches so that all of the modular units are capable of rotating in phase with respect to the angle of the sun, a removable clear cover at one closed position closing the top of the open containing box over the vertical sides for preventing heat losses and creating an enclosed heat sink to increase the heat absorbed in the circulating heat exchange fluid and at another removed position in the nighttime the system may be used for cooling by circulating the heat exchange fluid, the cover is constructed of a low reflective material which minimizes reflected heat loss, the heat exchanger fluid including water and anti-freeze additives which reduce the freezing point of the circulating water.

2. A solar heating and cooling system according to claim 1 wherein the heat absorbing tubing to and from each of the modular units being long and flexible to allow an optimum rotation.

3. A solar heating and cooling system according to claim 1 wherein further comprising a swimming pool being connected to the supply manifold and return manifold for heating pool water.

4. A solar heating and cooling system according to claim 1 wherein further comprising a heat exchanger coil being connected to the supply manifold and return manifold, the coil is positioned in a domicile water holding tank to form an indirect heat exchange relationship with the tank and to provide heat for the domicile water whereby the system and the heat exchanger coil may form a closed system.

5. A solar heating and cooling system according to claim 1 wherein the heat absorbing tubing is black and treated during or after manufacture to provide a matte-like finish which increases absorptivity and reduces reflectivity in order to maximize heat transfer.

* * * * *